3,383,197
POWDERED BRAZING MIXTURE
George F. Albers, West Chester, Ohio, and William I.
McClanahan, Audubon, Pa., assignors to General Electric Company, a corporation of New York
No Drawing. Filed Oct. 19, 1965, Ser. No. 498,075
4 Claims. (Cl. 75—.5)

This invention relates to powdered brazing mixtures and, more particularly to a mixture of nickel powder and a powdered silver base brazing alloy.

Silver base brazing alloys in powdered form have been used to join together nickel base alloy components used in high temperature operating propulsion apparatus. One example is the joining togther of spray bar components for gas turbine engines. It has been found however, that the use of these brazing alloys which otherwise have desirable characteristics has resulted in stress corrosion and early failure of the components being joined. In addition, it has been necessary, because of the flow characteristics of the silver base alloy powder, to torch braze the components together.

It is a principal object of the present invention to provide an improved mixture of powders, one of which is silver base brazing alloy, which can be used in furnace rather than torch brazing and which will inhibit the occurrence of stress corrosion in the articles being joined.

Another object is to provide a powdered brazing mixture including a silver base brazing alloy which can bridge relatively wide gaps, such as up to about 0.1", so that it will not flow appreciably from a joint between members to be brazed during furnace brazing.

These and other objects and advantages will be more readily understood from the following detailed description and examples which are meant to be typical of rather than any limitation on the scope of the present invention.

Whenever percentages are used in this specification, they mean percent by weight.

It has been found that by providing a mixture of powders which includes more than 50% but less than 75% nickel powder and the balance a silver base brazing alloy powder, the above objects can be achieved. More particularly, the brazing mixture of the present invention in one form consists essentially of more than 50% but less than 75% of a first powder of nickel and the balance a second powder comprising about 40% copper, about 54% silver, about 5% zinc about 1% nickel.

In the evaluation of the mixture of the present invention, composite powder mixtures ranging from 90% powdered nickel–10% of a powdered silver base brazing alloy, specified as AMS 4772, to 25% nickel–75% AMS 4772 were tested. The composition of brazing alloy powder AMS 4772 consists of, 53.0–55.0% silver, 39.0–41.0% copper, 4.0–6.0% zinc, 0.5–1.5% nickel and a total of other elements of up to 0.15%. Of the mixtures tested, that consisting essentially of 65% nickel powder and 35% AMS 4772 powder provided the best flowability, wettability and ductility properties. However, it was found that brazed joints including 75% nickel and 25% AMS 4772 were very brittle and could be broken easily. On the other hand the braze joint resulting from the mixture of 50% nickel powder and 50% AMS 4772 powder was too fluid for furnace brazing and hence ran out of the brazed joint. The 65% nickel powder–35% AMS 4772 powder mixture proved to be the preferred range from the sandpoint of flowability, wettability and ductility.

Stress rupture properties on a brazed joint between two components of the nickel base alloy were determined, along with the properties of the parent metal, at 1350° F. and at 30,000 p.s.i. The nickel base alloy parent metal consisted nominally of 15% Cr; 3% each of Cb, Mo and W; 7% Fe; 0.5% Al; 0.6% Ti; 0.005% B; up to .1% C with the balance Ni and incidental impurities. The parent metal failed in 37 hours. The brazed joint made from a mixture of powders consisting essentially of more than 50% and less than 75% powdered nickel with the balance AMS 4772 powder failed at 30–37 hours. The joint brazed with AMS 4772 powder alone failed at 18.6 hours. Thus it can be seen that the powder mixture of the present invention results in a brazed joint which closely approximates in strength that of the nickel base alloy parent metal. Vibration testing of a brazed joint, made from a powder mixture within the scope of the present invention, for 3600 cycles at amplitudes of between 0.225 and 0.350 double amplitude showed no failure in the brazed joint.

The brazing mixture of the present invention has provided an unusually useful tool particularly for the joining of nickel base components by furnace brazing procedures. Although the present invention has been described in connection with specific examples, it will be understood by those skilled in the art the variations and modifications of which this invention is capable.

What is claimed is:
1. An improved powdered brazing mixture consisting essentially of, by weight:
 more than 50% but less than 75% nickel powder; and
 the balance a silver base brazing alloy powder.
2. An improved powdered brazing mixture consisting essentially of, by weight:
 more than 50% but less than 75% nickel powder; and
 the balance a silver base brazing alloy powder including copper as a major alloying ingredient.
3. An improved powdered brazing mixture consisting essentially of, by weight:
 more than 50% but less than 75% nickel powder; and
 the balance a silver base brazing alloy powder comprising about 40% Cu, about 54% Ag and about 5% Zn.
4. An improved powdered brazing mixture consisting essentially of, by weight:
 about 65% nickel powder; and
 the balance a silver base brazing alloy powder consisting essentially of about 40% Cu, about 54% Ag, about 5% Zn and about 1% Ni.

References Cited
UNITED STATES PATENTS

| 3,073,269 | 1/1963 | Hoppin | 75—0.5 |
| 3,155,491 | 11/1964 | Hoppin | 75—0.5 |
| 3,305,356 | 2/1967 | Youdelis | 75—0.5 |
| 3,333,950 | 8/1967 | Hill | 75—0.5 |

DAVID L. RECK, Primary Examiner.
RICHARD O. DEAN, Examiner.